April 12, 1927.
S. J. REAP
1,624,759
CAGE LOCKING MEANS
Filed June 1, 1926
3 Sheets-Sheet 1
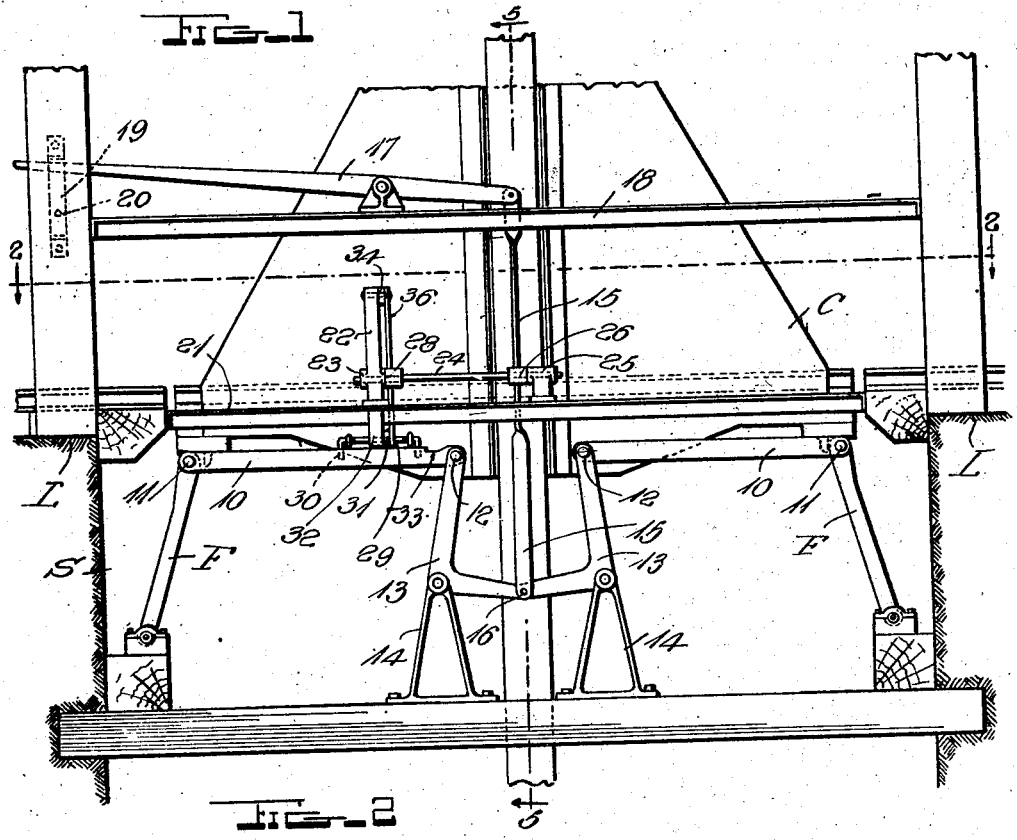
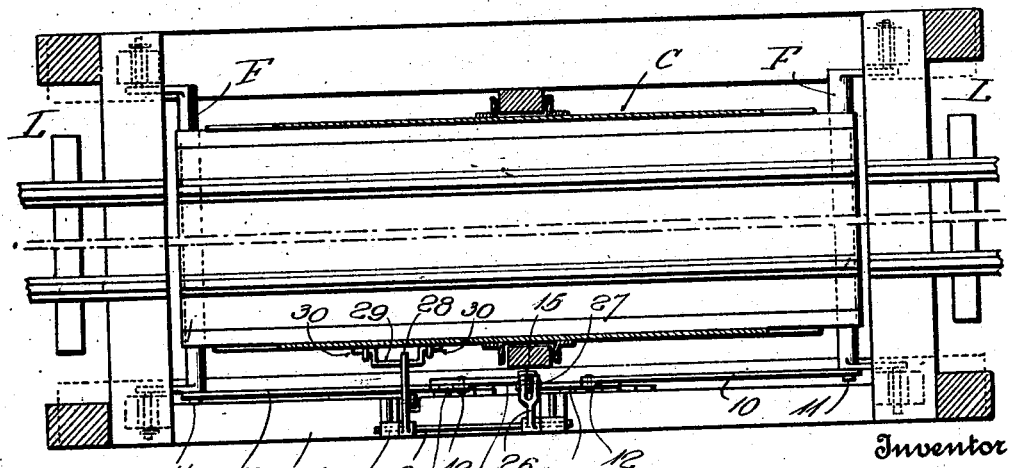
Inventor
Stephen J. Reap,
Witness
By H. B. Willson & Co.
Attorneys

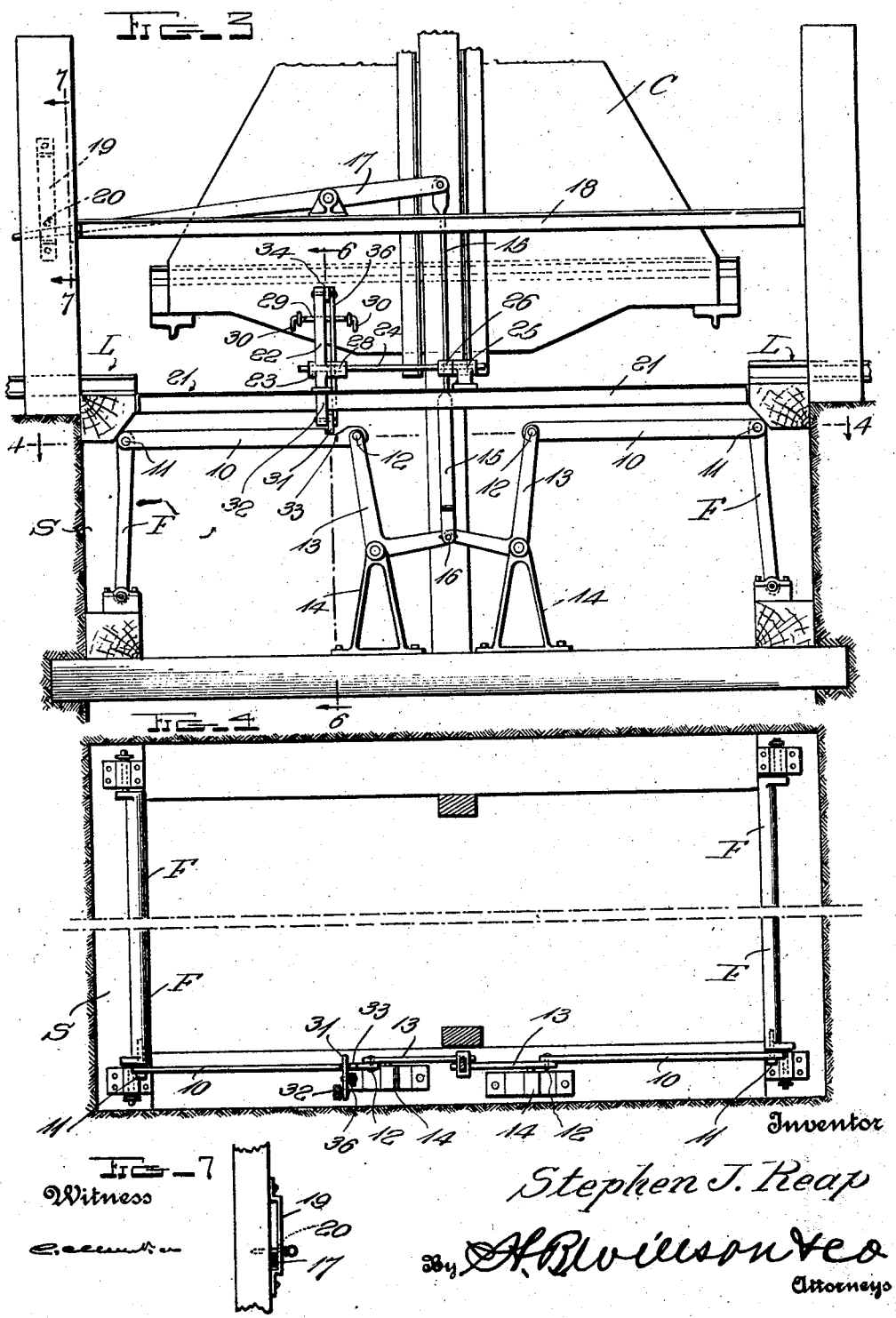

April 12, 1927.
S. J. REAP
1,624,759
CAGE LOCKING MEANS
Filed June 1, 1926
3 Sheets-Sheet 3
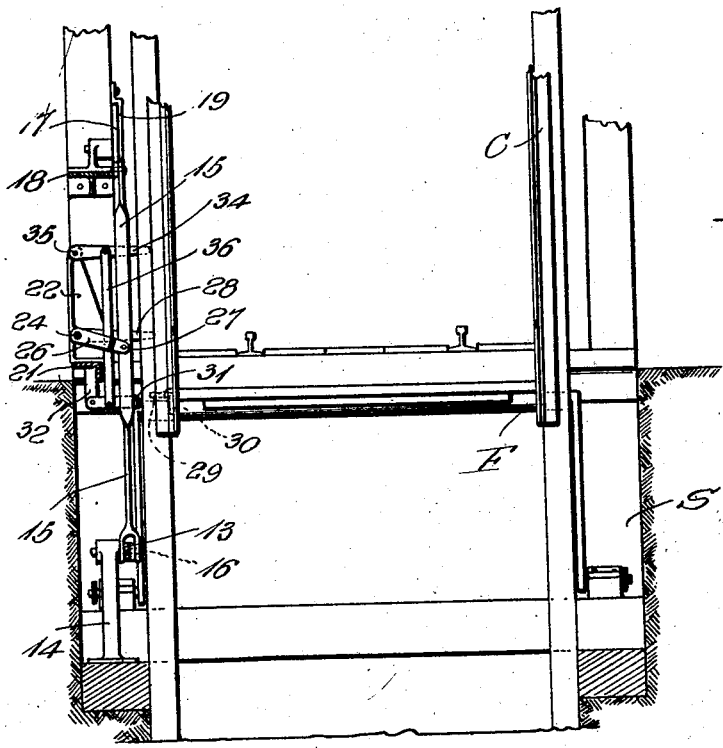
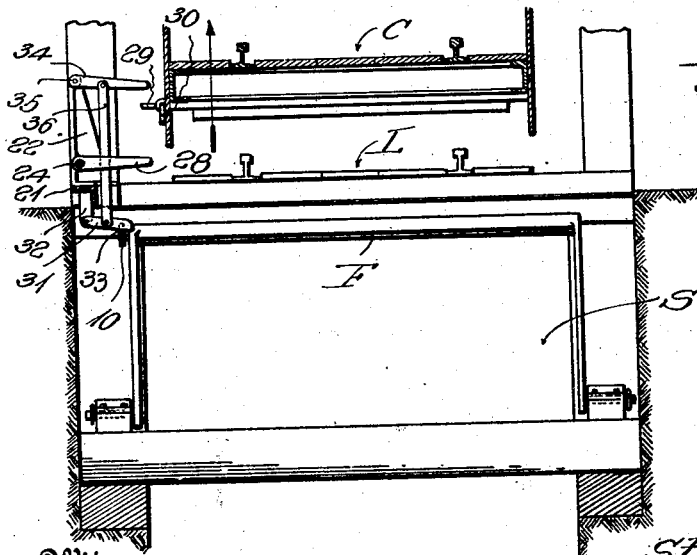
Inventor
Stephen J. Reap,
Witness
Attorneys Patented Apr. 12, 1927.

1,624,759

UNITED STATES PATENT OFFICE.

STEPHEN J. REAP, OF OLYPHANT, PENNSYLVANIA.

CAGE-LOCKING MEANS.

Application filed June 1, 1926. Serial No. 112,998.

In connection with the cages of mine shafts, it is customary to provide an arrangement of fans or checks at the landings, upon which to rest the cage while a car is being run onto or from the cage or while the latter is being otherwise loaded or unloaded. These fans are now projected by hand by an attendant and the cage is lowered onto them, being gradually brought to a standstill. If after resting on the fans, while loading or unloading, the cage is to be further lowered, it must first be elevated free of the fans and the latter then released by hand to permit descent of the cage, but if the cage is to be further elevated from the point in which it is held by the fans, it is customary to leave the latter projected until they must finally be retracted to permit descent of the cage.

It is the object of my invention to make novel provision, whereby the movements of the cage may be relied upon solely to control the projection and retraction of the fans, although provision is preferably made for operating them manually also, if desired.

With the foregoing in view, the invention resides in the novel subject matter hereinafter described and claimed, the description being supplemented by the accompanying drawings.

Figure 1 is a side elevation partly in section showing the improved construction in connection with a mine shaft, a cage and the fans, said fans being shown in projected operative positions.

Figure 2 is a horizontal section on line 2—2 of Figure 1.

Figure 3 is a view similar to Figure 1 but illustrating the relation of parts when the cage is elevated above the position of Figure 2, showing the fans latched in retracted inoperative position.

Figure 4 is a horizontal section on line 4—4 of Figure 3.

Figure 5 is a vertical transverse section as indicated by line 5—5 of Figure 1.

Figure 6 is a vertical transverse sectional view on line 6—6 of Figure 3.

Figure 7 is a detail vertical section as indicated by line 7—7 of Figure 3.

In the drawings above briefly described, S designates a portion of a mine shaft, C has reference to a cage movable within the shaft in the usual manner, and L designates a landing of the shaft. Two fans F are shown pivotally mounted at opposite sides of the shaft for movement to and from the operative and inoperative positions shown in Figs. 1 and 3 respectively, said fans when in the position of Fig. 1, serving to support the cage C at the landing L, while said fans are positioned out of the path of said cage when disposed as shown in Fig. 3.

Links 10 are positioned horizontally between the fans F and have their outer ends pivoted to said fans as indicated at 11, the inner ends of these links being pivoted at 12 to a pair of bell cranks 13 which are suitably mounted upon brackets or the like 14 at one side of the shaft S. A vertical link 15 is connected at its lower end at 16 with the bell cranks 13, so that vertical movement of this link will either project or retract the fans, according to the direction of such movement. In the present showing, the upper end of link 15 is pivoted to a hand lever 17 mounted on a horizontal supporting bar 18 within reach of an attendant at the landing L, the end of this lever remote from the link 15, being slidable in a vertical guide 19. By manipulation of lever 17, the fans F may be projected or retracted by hand should this be desired, and by inserting a pin in an opening 20 in said guide, said lever may be locked in such a position as to hold the fans retracted, as disclosed in Fig. 3. Ordinarily however, this pin is not inserted in the opening 20, so that automatic movement of the fans may be effected, by the means described below.

Suitably mounted below the bar 18, is a second horizontal bar 21 to which a bracket or standard 22 is secured, the lower portion of this standard having a bearing 23 for one end of a horizontal rock shaft 24, the other end of this rock shaft being received in the bearing 25 on the bar 21. Shaft 24 is provided with an inwardly projecting crank arm 26 which is suitably connected at 27, to the link 15, so that movement of the rock shaft may be relied upon to produce either raising or lowering of this link, in the same manner as actuation of lever 17 would produce these movements. The shaft 24 is also provided with an actuating arm or trip 28 which is in the path of another trip 29 mounted on one side of the cage C, this trip being pivotally mounted so that it is free to swing upwardly toward the cage, but is limited in its downward swinging by stops 30, to a position at which it projects laterally from said cage. As seen in Figs. 1 and 5, when the fans F are projected and support the cage C, the actuating arm 28 is spaced a considerable distance above the trip 29, but if the cage is raised sufficiently, said trip will engage said arm 28, thus turning the shaft 24 and causing the arm 26 to raise the bell link 15, and this movement, causes the bell cranks 13 and links 10 to retract the fans F, to the position of Fig. 3, and when this relation has been reached, the trip clears the arm 28, so that the cage may further ascend if desired. Provision is also made for holding the fans in retracted position after they are once retracted, so that if after upward movement of the cage sufficiently to retract said fans, the cage is to be further lowered, this may be done without interference on the part of the fans.

In the present showing, a latch 31 is pivoted to a support 32 which projects downwardly from the bar 21, said latch overlying one of the links 10, in readiness to drop by gravity into a notch 33 in the upper edge of this link, when the fans are retracted. In this connection, attention may be directed to Figs. 3 and 6, both of which show the latch 31 in the notch 33 of link 10. For releasing this latch 31 when desired, an upper arm or trip 34 is pivoted at 35 to the standard 22 and projects toward the cage C, at a point above the arm 28, and said arm 34 is connected by a link or other suitable means 36 with the latch 31. It thus follows, that if the cage is raised sufficiently from any position to permit its trip 29 to engage the arm 34 and swing the latter upwardly, link 36 will release the latch 31, permitting the fans F to project themselves by gravity or otherwise, to operative position.

It will be remembered that upon initial ascent of the cage C from the position of Fig. 1, the trip 29 engaged the arm 28 and effected retraction of the fans F to the position of Fig. 3, the latch 31 then holding the fans in this retracted position, so that the cage can descend if desired. If the cage is to ascend, however, instead of descend, the trip 29 must necessarily engage arm 34, releasing the latch 31 and permitting the fans F to again project, and as the cage ascends, the fans are left in this projected position, but if their use is not again necessary to support the cage on its next trip downward, the lever 17 may be actuated to retract said fans, and the latch 31 will then immediately come into play to hold them in retracted position. In this connection, it may further be explained that after the fans F have been left in projected position by ascent of the cage C, they need not be returned to the position of Fig. 3, by hand. Instead, upon the next descent of the cage, it may be stopped just after the trip 29 moves below the arm 28. Then, the cage may be raised sufficiently to cause said trip and arm to turn the shaft 24 and cause the arm 26 to upwardly pull the link 15, which movement causes the bell cranks 13 and links 10 to retract the fans, the latch 31 then coming into play to hold them. The cage is of course stopped when trip 29 clears arm 28 and before it engages arm 34. The cage may now further descend, as will be readily understood and as said cage descends, while the trip 29 will engage the arm 28, it will merely swing upwardly so that no interference with downward travel of said cage will take place.

It will be seen from the foregoing that exceptionally simple and inexpensive, yet efficient and desirable means have been provided to effect a great deal of the fan setting which must now be done by hand. Thus, the invention relieves the headman or footman from a portion of his duties, by accomplishing certain automatic setting of the fans.

On account of advantages existing for the general constructions herein disclosed, it is preferably followed. However, within the scope of the invention as claimed, variations may of course be made.

I claim:

1. In combination with a shaft and a cage mounted for movement therein; a projectable and retractable support to sustain the weight of the cage at a desired landing, a rock shaft mounted at one side of the cage, said rock shaft being stationary with respect to the movement of said cage, an actuating arm for said rock shaft rigidly secured thereto and projecting laterally therefrom toward the cage, said cage having a trip portion adapted to engage said arm and rock said shaft only when the cage moves in one direction, a second arm rigidly secured to and projecting from said rock shaft, and operating connections between said second arm and said support for retracting the latter when said shaft is turned by the first named arm.

2. In combination with a shaft and a cage mounted for movement therein; a projectable and retractable support to sustain the weight of the cage at a desired landing, a rock shaft mounted at one side of the cage, said rock shaft being stationary with respect to the movement of the cage, an actuating arm for said rock shaft projecting laterally therefrom toward the cage, a trip on said cage adapted to engage said arm and rock said shaft only when the cage moves in one direction, a second arm secured to and projecting from the rock shaft, a bell crank operatively connected with said support and having an arm below said second arm, and a connection between said second arm and said arm of the bell crank.

3. In combination with a shaft and a cage mounted for movement along the same; a projectable and retractable support to sustain the weight of the cage at a desired landing, cage-controlled means for retracting said support, including a trip stationary with respect to the cage and actuated by the latter to effect retraction of the support, positive holding means for retaining said support in a retracted position, and releasing means for said holding means, including a movably mounted cage-actuated trip spaced above the aforesaid trip to effect release of said holding means upon ascent of the cage, permitting projection of the support.

4. In combination with a shaft and a cage mounted for movement along the same; a projectable and retractable support to sustain the weight of said cage at a given landing, a horizontally positioned link connected to said support for projecting and retracting it, a bell crank pivotally connected with said link and mounted at one side of the shaft, a vertical link rising from and connected with said bell crank, a rock shaft mounted horizontally at one side of the shaft and having a crank arm pivotally connected with the end of said vertical link, an actuating arm projecting from said rock shaft toward the cage, a trip projecting from the cage and adapted to engage said actuating arm to rock said shaft only when the cage ascends, whereby to effect retraction of said support, a latch engageable with said horizontal link to hold said support in retracted position, a third arm mounted above said actuating arm and adapted to be upwardly swung by said trip, and a releasing connection between said third arm and said latch for releasing the latter when the former is upwardly swung.

In testimony whereof I have hereunto affixed my signature.

STEPHEN J. REAP.